United States Patent [19]

Horiuchi et al.

[11] Patent Number: 4,976,105
[45] Date of Patent: Dec. 11, 1990

[54] HYDRAULIC BOOSTER SYSTEM WITH ACCUMULATOR

[75] Inventors: Makoto Horiuchi; Atsushi Shimizu, both of Ueda; Yoshitaka Miyakawa; Kazuya Sakurai, both of Wako, all of Japan

[73] Assignees: Nissin Kogyo Kabushiki Kaisha, Ueda; Honda Giken Kogyo Kabushiki Kaisha, Tokyo, both of Japan

[21] Appl. No.: 274,579

[22] Filed: Nov. 22, 1988

[30] Foreign Application Priority Data

Nov. 27, 1987 [JP] Japan ............................. 62-299001
Mar. 25, 1988 [JP] Japan ............................... 63-71600

[51] Int. Cl.⁵ ..................... B60T 13/14; B60T 13/12
[52] U.S. Cl. .................................. 60/413; 60/547.1; 60/550; 91/372; 91/373
[58] Field of Search ................ 60/413, 547.1, 550; 91/372, 373

[56] References Cited

U.S. PATENT DOCUMENTS 3,170,536  2/1965  Van House et al. ............ 60/413 X
3,889,467  6/1975  Huffman et al. ................. 60/413 X
3,898,808  8/1975  Ewald et al. .................... 60/413 X
4,660,381  4/1987  Kuromitu ......................... 60/413 X
4,835,967  6/1989  Nomura ............................ 60/413 X
4,875,665  6/1989  Kato et al. ....................... 60/413 X Primary Examiner—Edward K. Look
Assistant Examiner—George Kapsalas
Attorney, Agent, or Firm—Armstrong, Nikaido, Marmelstein, Kubovcik & Murray

[57] ABSTRACT

A hydraulic booster for a master cylinder in which an inlet valve is interposed between an output pressure chamber at the back of the booster piston and an input pressure chamber connected to a pressure source. Advance of the valve piston opens the inlet valve. An outlet valve between the output chamber and an outlet chamber connected to an oil tank closes at advance of the valve piston relative to the booster piston. The booster chamber is exposed to a rear of a master cylinder operation piston. The valve piston oil feed passage connects input pressure chamber with booster chamber at opening of the outlet valve. The reaction chamber at the front surface of the booster piston is reduced in volume with the advancing movement and is connected to an accumulator making it possible to smooth initial operation of the master cylinder and reduce booster system size.

18 Claims, 7 Drawing Sheets

HYDRAULIC BOOSTER SYSTEM WITH ACCUMULATOR

BACKGROUND OF THE INVENTION

1. Field of the Invention

The present invention relates to a hydraulic booster system and more particularly, to a hydraulic booster system for use in a brake device for a vehicle.

2. Description of the Prior Art

There is such a conventionally known hydraulic booster system disclosed, for example, in Japanese Patent Application Laid-open No. 113549/86.

In the above prior art system, a valve piston connected to an operating member is slidably received in a booster piston which is slidable within a booster cylinder in the hydraulic booster and which is abuttable against an operation piston in a master cylinder, so that supply and release of a hydraulic pressure into and from an output hydraulic pressure chamber facing a back of the booster piston are changed over in accordance with the relative operation between the booster piston and the valve piston. Therefore, at an initial stage of operation by the operating member, the start of operation of the booster piston is liable to be delayed due to a friction at a sealing portion between the booster piston and the booster cylinder and hence, the initial operation of the operation piston in the master cylinder is not smooth.

SUMMARY OF THE INVENTION

The present invention has been accomplished with such circumstances in view, and it is an object of the present invention to provide a hydraulic booster system wherein the initial operation of the operation piston in the master cylinder is smoothed, and a reduction in size is possible.

To attain the above object, according to the present invention, there is proposed a hydraulic booster system comprising a booster cylinder connected to a rear end of a cylinder body of a master cylinder; an inlet valve interposed between an output hydraulic pressure chamber defined to face a back of a booster piston and an input hydraulic pressure chamber leading to a hydraulic pressure supply source, the booster piston being received in the booster cylinder for forward and rearward movement and being spring-biased rearwardly, the inlet valve being adapted to be opened in accordance with an advancing operation of a valve piston, slidably received in the booster piston in a manner connected to an operating member, relative to the booster piston; an outlet valve interposed between the output hydraulic pressure chamber and an outlet chamber leading to an oil tank and adapted to be closed in accordance with the advancing operation of the valve piston relative to the booster piston; a booster chamber provided to face a rear end of an operation piston of the master cylinder; an oil feed passage made in the valve piston and adapted to permit communication between the input hydraulic pressure chamber and the booster chamber in response to opening of the inlet valve and further permit communicaton between the booster chamber and the outlet chamber in response to opening of the outlet valve; a reaction chamber provided to face a front surface of the booster piston and adapted to be reduced in volume in accordance with the advancing movement of the booster piston; and an accumulator connected to the booster cylinder so as to lead to the reaction chamber.

With the above construction, at an initial stage of operation where the valve piston is urged forwardly by the operating member, the outlet valve is closed and thereafter, the inlet valve is opened, so that a hydraulic pressure is supplied into the booster chamber. Thus, the hydraulic pressure acts on the rear end of the operation piston regardless of the operation of the booster piston to urge the operation piston forwardly. Therefore it is possible to smooth the initial operation of the operation piston in the master cylinder. Furthermore, a reaction force established by the accumulator acts, from the front, on the booster piston which is urged forwardly by the hydraulic pressure in the output hydraulic pressure chamber. This makes it possible to reduce the spring force for biasing the booster piston rearwardly, permitting a reduction in size of the spring, leading to a contribution to a reduction in size of the system.

If the accumulator is formed to be detachably connected to the booster cylinder, it is facilitated to replace the accumulator by another accumulator of a different characteristic, and this makes it possible to easily adjust the relationship between the operation stroke and the output hydraulic pressure without varying the interior structure of the booster cylinder.

Further, if the accumulator is constructed to include an accumulator case in which an accumulator piston is slid to define therein an accumulator chamber leading to the reaction chamber and a biasing means for biasing the accumulator piston in a direction to contract the accumulator chamber, and if it is arranged that the biasing member is replaceable by another of a different characteristic, it is facilitated to vary the characteristic of the accumulator by replacement of the biasing member, and this likewise makes it possible to easily adjust the relationship between the operation stroke and the output hydraulic pressure.

The above and other objects, features and advantages of the invention will become apparent from a reading of the following description of the preferred embodiments, taken in conjunction with the accompanying drawings.

DESCRIPTION OF THE PREFERRED EMBODIMENTS

The present invention will now be described by way of embodiments with reference to the accompanying drawings.

Figure 1:
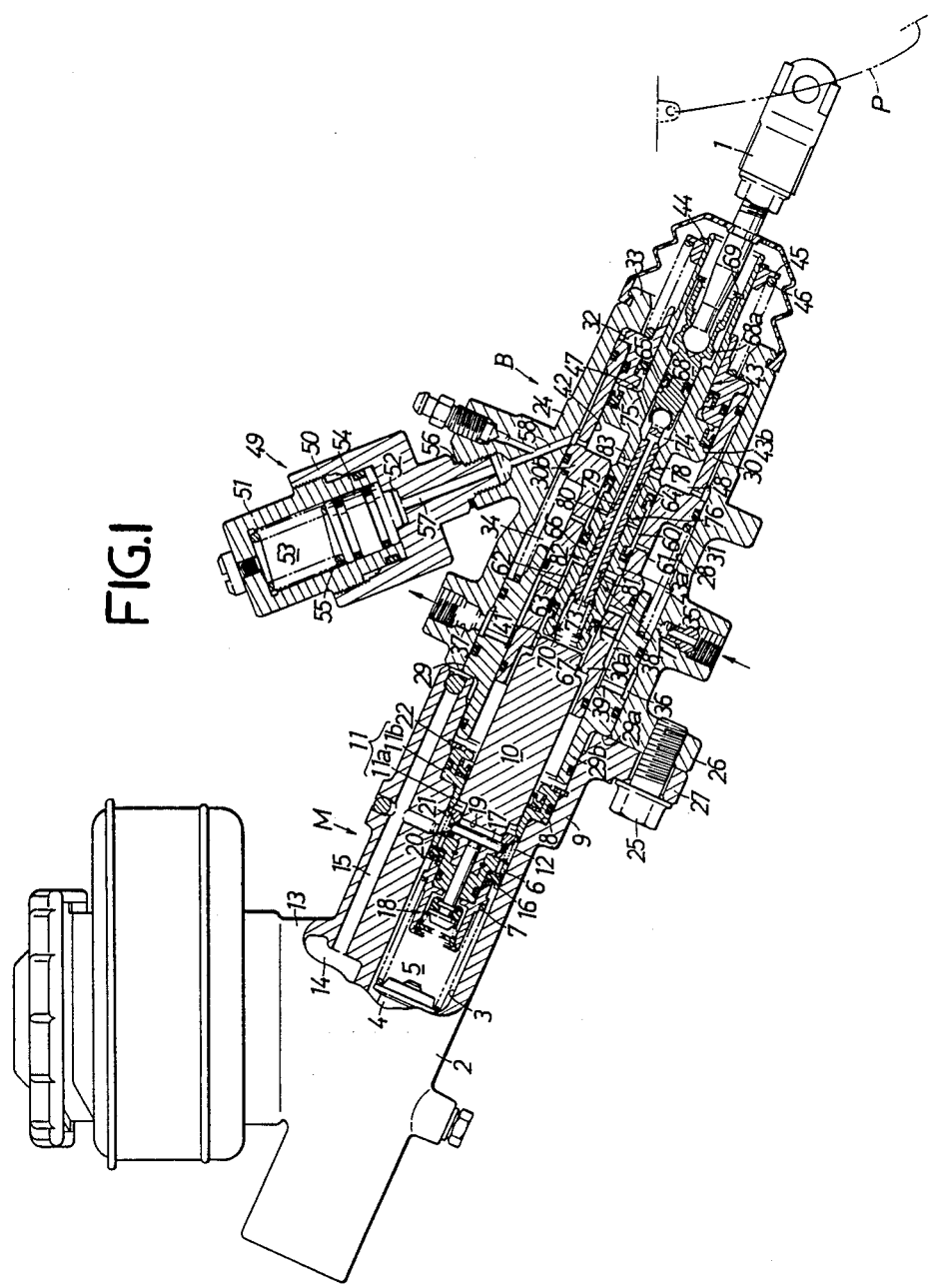
FIGS. 1 and 2 illustrate a first embodiment of a hydraulic booster system according to the present invention, FIG. 1 being a longitudinal sectional side view of the system, and FIG. 2 being a graph of an output characteristic of the system.

First, a first embodiment of the present invention will be described with reference to FIGS. 1 and 2. Referring to FIG. 1, the hydraulic booster system is used for a braking device carried on an automobile and comprises a hydraulic booster B connected to a rear portion of a master cylinder M, so that by advancing operation of a push rod 1 as an operating member operatively connected to a brake pedal P in accordance with depression of the brake pedal P, a boosting operation of the hydraulic booster B takes place to generate a hydraulic braking pressure in the master cylinder M.

The master cylinder M is a tandem type master cylinder whose cylinder body 2 is provided with a cylinder bore 3 closed at its front end. A front operation piston 4 and a rear operation piston 6 are slidably received in the cylinder bore 3. The front piston 4 defines a hydraulic pressure chamber against a front end wall of the bore 3, while the rear piston 6 defines another hydraulic pressure chamber 5 between itself and the front piston 4. A spring (not shown) is interposed between the front end wall of the cylinder body 2 and the front operation piston 4 for biasing the operation piston 4 rearwardly, and a spring 7 is interposed between the front operation piston 4 and the rear operation piston 6. Thus, urging the rear operation piston 6 forwardly causes the front hydraulic pressure chamber and the rear hydraulic pressure chamber 5 to be reduced in volume, whereby a hydraulic braking pressure is output from the hydraulic pressure chambers.

A connecting tubular portion 9 formed with a step 8 against the cylinder bore 3 is provided at a rear portion of the cylinder body 2 coaxially with the cylinder bore 3 to project therefrom. On the other hand, a rearwardly extending piston rod 10 is secured at its front end to the operation piston 6, and a guide member 11 is fixed to the rear portion of the cylinder body 2 to guide the movement of the piston rod 10. The guide member 11 is comprised of a cylindrical fitting portion 11a fitted into a rear end of the cylinder bore 3, and a rib-like abutment receiving portion 11b projecting radially outwardly from a rear end of the cylindrical fitting portion 11a. The abutment receiving portion 11b is oil-tightly fitted in the connecting tubular portion 9 and abuts against the step 8. Furthermore, a retaining ring 22 is fitted on an inner surface of the tubular connecting portion 9 to engage with an outer peripheral edge of the abutment receiving portion 11b which is in abutment against the step 8, thereby ensuring that the guide member 11 is fixed to the cylinder body 2. The piston rod 10 is oil-tightly and movably passed through the guide member 11 to extend toward the hydraulic booster B.

A supplemental oil chamber 12 is defined between the guide member 11 and the operation piston 6, and the cylinder body 2 is provided with an oil passage 15 which permits an oil reservoir 14 within an oil tank 13 formed at an upper portion of the cylinder body 2 to communicate with the supplement oil chamber 12. A cup seal 16 is fitted over the operation piston 6 in slidable contact with an inner surface of the cylinder bore 3, and the cup seal 16 and the operation piston 6 are constructed to permit flowing of a working oil from the supplement oil chamber 12 into the hydraulic pressure chamber 5 when the latter is depressurized more than the supplement oil chamber 12.

A valve mechanism 18 driven to be opened and closed by a stopper pin 17 is disposed at a front portion of the operation piston 6 to put the hydraulic pressure chamber 5 and the supplement oil chamber 12 into and out of communication with each other, and is urged and opened by the stopper pin 17 when the operation piston 6 has been retreated to its retreat limit. The stopper pin 17 is inserted through an elongated hole 19 made axially long in the piston rod 10 to intersect an axis of the piston rod 10 at a right angle, and is fixed, at its opposite ends projecting from an outer peripheral surface of the piston rod 10, to a cylindrical holder 20 which is disposed in the supplemental oil chamber 12 to surround the piston rod 10. Furthermore, the holder 20 is biased in a direction to abut against the guide member 11 by a spring 21 interposed between the operation piston 6 and the holder 20, thereby ensuring that the stopper pin 17 is substantially fixed to the cylinder body 2.

A booster cylinder 24 of the hydraulic booster B is coaxially joined to a rear end of the cylinder body 2, and the cylinder body 2 and the booster cylinder 24 are coupled by a bolt 25. More specifically, a flange 26 provided at a front end of the booster cylinder 24 and a flange 27 provided at a rear end of the cylinder body 2 are coupled by the bolt 25.

A cylinder bore 28 is provided in the booster cylinder 24 coaxially with the cylinder bore 3 in the master cylinder M, and a tubular guide 29 is slidably received in the cylinder bore 28. A smaller diameter tubular portion 29b is coaxially provided at a front portion of the tubular guide 29 through a step 29a which abuts against a rear end of the connecting tubular portion 9 in the cylinder body 2. The smaller diameter tubular portion 29b is oil-tightly fitted in the tubular connecting portion 9. A cylindrical piston guide 30 is also slidably received in the cylinder bore 28, and has a cylindrical smaller diameter portion 30a coaxially provided at a front portion of the cylindrical piston guide 30 through a step 30b and slidably received in the tubular guide 29. Moreover, a spring 31 is mounted in compression between the tubular guide 29 and the piston guide 30 to exhibit a spring force for biasing these guides away from each other. Further, a receiving tube 32 is oil-tightly fitted in a rear end portion of the piston guide 30 to abut against the same. The receiving tube 32 is engaged to a restricting rib 33 projecting radially inwardly at a rear end of the booster cylinder 24.

An annular hydraulic pressure chamber 34 is defined between the booster cylinder 24, the tubular guide 29 and the piston guide 30, and the booster cylinder 24 is provided with an inlet oil passage 35 permitting a hydraulic pressure supply source (not shown) to communicate with the annular hydraulic pressure chamber 34. The spring 31 is contained in the annular hydraulic pressure chamber 34, so that the piston guide 30 is biased rearwardly and the tubular guide 29 is biased forwardly, both by a hydraulic pressure introduced into the annular hydraulic pressure chamber 34 and the spring 31. An annular oil chamber 36 is defined between the tubular guide 29 and the booster cylinder 24, and an outlet oil passage 37 is provided in the booster cylinder 24 to put the oil chamber 36 into communication with an oil tank which is not shown. Further, an annular oil passage 38 is provided between the smaller diameter portion 30a of the piston guide 30 and the tubular guide 29, and an oil passage 39 is made in the tubular guide 29 to put the annular oil passage 38 into communication with the oil chamber 36.

The piston guide 30 is provided with a first cylinder bore 41 closer to its front end, and with a second cylinder bore 42 closer to its rear end, which has a diameter larger than that of the first cylinder bore 41 and is coaxially connected to the first cylinder bore 41. A booster piston 43 is slidably received in the first and second cylinder bores 41 and 42. More specifically, the booster piston 43 is basically formed into a cylindrical shape to have a smaller diameter portion 43a slidably received in the first cylinder bore 41 and a larger diameter portion 43b projecting radially outwardly at a rear end of the smaller diameter portion 43a and slidable in the second cylinder bore 42. A rear end of the booster piston 43 is oil-tightly and movably passed through the receiving tube 32 to project rearwardly. A retaining ring 44 is fitted over an outer surface of the rear end of the booster piston 43, and a return spring 46 is mounted in compression between a receiving member 45 engaging the retaining ring 44 and the receiving tube portion 32. Thus, the booster piston 43 is biased rearwardly.

An annular output hydraulic pressure chamber 47 is defined between the larger diameter portion 43b of the booster piston 43 and the receiving tube 32 and thus faces to the back of the booster piston 43. An annular reaction chamber 48 is also defined between the larger diameter portion 43b of the booster piston 43 and the step 30b in the piston guide 30 and faces to the back of the booster piston 43.

An accumulator 49 is connected to the reaction chamber 48 and added to the booster cylinder 24. The accumulator 49 is comprised of a cylindrical bottomed mounting 50 screwed into the booster cylinder 24, a cylindrical bottomed cylinder body 51 screwed into the mounting 50 in an oil-tightly fitted manner, a piston 54 oil-tightly and slidably received in the cylinder body 51 to provide an oil chamber 52 between a closed end of the mounting 50 and the piston 54 and to provide a spring chamber 53 between a closed end of the cylinder body 51 and the piston 54, and a spring 55 contained in the spring chamber 53 to bias the piston 54 in a direction to contract the oil chamber 52. Moreover, the pressure receiving area of the piston 54 facing to the oil chamber 52 is set to be smaller than that of the booster piston 43 facing to the reaction chamber 48. The accumulator 49 is attached to the booster cylinder 24 so that the oil chamber 52 thereof lies below the oil reservoir 14 of the oil tank 13.

The mounting 50 is screwed into the booster cylinder 24 with a sealing member 56 interposed between the outer surface of the booster cylinder 24 and the mounting 50 and is provided at its closed end with an oil passage 57 leading to the oil chamber 52, and the booster cylinder 24 is provided with an oil passage 58 which permits the oil passage 57 to communicate with the reaction chamber 48.

An annular input hydraulic pressure chamber 60 oil-tightly sealed at its axially opposite ends is defined between an intermediate portion of the smaller diameter portion 43a of the booster piston 43 and an inner surface of the first cylinder bore 41 in the piston guide 30, and the smaller diameter portion 30a of the piston guide 30 is provided with a communication hole 61 which allows the input hydraulic pressure chamber 60 to communicate with the annular hydraulic pressure chamber 34 regardless of the advancing movement of the booster piston 43. In addition, in front of the input hydraulic pressure chamber 60, the smaller diameter portion 43a of the booster piston 43 is provided on its outer surface with an annular recess to provide an annular outlet chamber 62 sealed at its axially opposite ends, and the cylindrical smaller diameter portion 30a of the piston guide 30 is provided with a communication hole 63 which permits the outlet chamber 62 to normally communicate with the annular oil passage 38 irrespective of the operation of the booster piston 43. Thus, the outlet chamber 62 normally communicates with the oil tank.

A front smaller diameter cylinder bore 64 and a rear larger diameter cylinder bore 65 are coaxially provided in the booster piston 43, and a valve piston 66 connected to the push rod 1 is slidably received in the smaller diameter cylinder bore 64. On the other hand, the rear end of the piston rod 10 coaxially connected to the operation piston 6 in the master cylinder M is inserted in the front end portion of the piston guide 30 in an opposed relation to a front end of the booster piston 43, and a booster chamber 67 facing to the rear end of the piston rod 10 is defined by the cylindrical connecting portion 9, the guide member 11, the cylindrical guide 29, the piston guide 30, the booster piston 43 and the valve piston 66, so that the operation piston 6 is operated to advance by introduction of a hydraulic pressure into the booster chamber 67.

A connecting rod 68 is oil-tightly and slidably received in the larger diameter bore 65 of the booster piston 43 and connected at its front end to a rear end of the valve piston 66. The front end of the push rod 1 is connected to a rear end of the connecting rod 68. Moreover, a retaining ring 69 is fitted on an inner surface at the rear end of the booster piston 43 to abut against the rear end of the connecting rod 68 to provide a retreat limit for the connecting rod 68, i.e., the valve piston 66. A spring 71 is mounted in compression between a retaining ring 70 fitted on the inner surface at the front end of the booster piston 43 and a front end of the valve piston 66 for biasing the valve piston 66 rearwardly.

The valve piston 66 is coaxially provided with an oil feed passage 73 opened at its front end to communicate with the booster chamber 67, and a rear end of the oil feed passage 73 is communicated with an annular chamber 74 which is defined by the booster piston 43, the valve piston 66 and the connecting rod 68. Further, the booster piston 43 is provided with an oil passage 75 which permits the annular chamber 74 to communicate with the output hydraulic pressure chamber 47. Thus, the booster chamber 67 and the output hydraulic pressure chamber 47 normally communicate with each other through the oil feed passage 73.

Between the valve piston 66 and the booster piston 43, there are an inlet valve 76 permitting and blocking the communicaton between the input hydraulic pressure chamber 60 and the oil feed passage 73, an outlet valve 77 permitting and blocking the communication between the outlet chamber 62 and the oil feed passage 73, and an on/off valve 78 permitting and blocking the communication between the reaction chamber 48 and the oil feed passage 73.

The inlet valve 76 is comprised of an annular recess 79 provided on a central and outer surface of the valve piston 66 in communication with the oil feed passage 73, and an inlet valve bore 80 made in the booster piston 43 in communication with the input hydraulic pressure chamber 60. The annular recess 79 is provided to be relatively long axially of the valve piston 66, and the inlet valve bore 80 is provided radially of the booster piston 43. Such inlet valve 76 is opened when the inlet valve bore 80 has communicated with the annular recess 79, and the annular recess 79 and the inlet valve bore 80 are positioned so that the latter is in a location in front of the annular recess 79 to close the valve 76 when the valve piston 66 is at the retreat limit relative to the booster piston 43 and thus, the inlet valve 76 is opened when the valve piston 66 has been operated to advance relative to the booster piston 43.

The outlet valve 77 is comprised of a first outlet valve bore 81 made in the valve piston 66 in communication with the oil feed passage 73, and a second outlet valve bore 82 made in the booster piston 43 in communication with the the outlet chamber 62, both of the outlet valve bores 81 and 82 being radially made in mutually corresponding locations in the valve piston 66 and the booster piston 43, respectively. Such outlet valve 77 is slightly open with the first and second outlet valve bores 81 and 82 being in communication with each other when the valve piston 66 is at the retreat limit relative to the booster piston 43, and the outlet valve 77 is closed before opening of the inlet valve 76 upon starting of advancing movement of the valve piston 66 relative to the booster piston 43.

The on/off valve 78 is comprised of the annular recess 79 and a valve bore 83 made in the booster piston 43 in communicaton with the reaction chamber 48. The on/off valve 78 is slightly open with the valve bore 83 being in communication with the annular recess 79 when the valve piston 66 is at the retreat limit relative to the booster piston 43, and the valve 78 is closed before closing of the outlet valve 77 upon starting of the advancing movement of the valve piston 66 relative booster piston 43.

The operation of the first embodiment will be described below. When the brake pedal P is in an inoperative state, the valve piston 66 is held at the retreat limit relative to the booster piston 43 by a spring force of the spring 71, and the booster piston 43 is held at the retreat limit relative to the piston guide 30 by the action of the spring 46. In such condition, the inlet valve 76 is closed, while the outlet valve 77 and the on/off valve 78 are open, so that the booster chamber 67, the output hydraulic pressure chamber 47 and the reaction chamber 48 are under the atmospheric pressure. Accordingly, the operation piston 6 in the master cylinder M has been retreated to the retreat limit by the action of the spring 7.

If the brake pedal P is depressed in such condition to brake the automobile, the valve piston 66 is urged forwardly from the brake pedal P through the push rod 1 and the connecting rod 68. In accordance with the advancing movement of the valve piston 66 relative to the booster piston 43, the on/off valve 78 is first closed and the outlet valve 77 is then closed and subsequently, the inlet valve 76 is opened. This causes the input hydraulic pressure chamber 60 and the booster chamber 67 to be put into communication with each other, so that as a result of the introduction of a working oil pressure into the booster chamber 67, the operation piston 6 receives a hydraulic pressure on its back to advance, thereby starting the boosting operation of the master cylinder M.

At an initial stage of the starting of such boosting operation, a hydraulic pressure is supplied into the booster chamber 67 in accordance with the advancing movement until the valve piston 66 opens the inlet valve 76, thereby causing the operation piston 6 to advance. Therefore, as compared with the prior art wherein the operation piston is urged by the booster piston, the operation piston 6 can be rapidly urged regardless of a friction of the sealed portion between the booster piston 43 and the piston guide 30 and thus, the initial operation of the operation piston 6 can be smoothed.

When the inlet valve 76 has been opened, the hydraulic pressure is supplied into the booster chamber 67, as described above and also into the output hydraulic pressure chamber 47, so that the booster piston 43 also advances relative to the valve piston 66 by reception of the hydraulic pressure on the back of the booster piston 43 and hence, the inlet valve 76 is closed, while at the same time, the outlet valve 77 is opened. The operation piston 6 is advanced by the hydraulic pressure acting on the booster chamber 67 before closing of the inlet valve 76 and opening of the outlet valve 77, so that the output hydraulic pressure from the master cylinder M suddenly increases as indicated by a characteristic line $P_0$-$P_1$ in FIG. 2. This immediately eliminates any plays at the individual portions up to the terminal of the brake.

After the output hydraulic pressure has reached a point $P_1$, the advancing movement of the valve piston 66 in accordance with the depression of the brake pedal P causes the advancing movement of the valve piston 66 relative to the booster piston 43 and the advancing movement of the booster piston 43 relative to the valve piston 66 to be alternately repeated, resulting in the opening and closing of the inlet valve 76 and the outlet valve 77 being alternatively repeated. Accordingly, the hydraulic pressure in the booster chamber 67 and the amount of advancing movement of the operation piston 6 also increase depending upon the amount of advancing movement of the valve piston 66, and the output hydraulic pressure from the master cylinder M increases depending upon the stroke, as indicated by a characteristic line $P_1$-$P_2$.

Now, during such advancing movement of the valve piston 66, the booster piston 43 operated to advance by the hydraulic pressure in the output hydraulic pressure chamber 47 advances while compressing the return spring 46 and reducing the volume of the reaction chamber 48 in front thereof, wherein during the advancing movement of the booster piston 43, the on/off valve 78 is in a closed state, and the reaction chamber 48 becomes tightly closed. Therefore, the working oil in the reaction chamber 48 urges the piston 54 while compressing the spring 55 in the accumulator 49. Thus, the booster piston 43 advances while receiving a reaction force provided by the spring 55 in front thereof and a reaction force provided by the spring 46.

When the step 43b in the booster piston 43 abuts against the step 30b in the piston guide 30 as the booster piston 43 advances, the advancing movement of the booster piston 43 is blocked. Thus and thereafter, only the valve piston 66 advances with the inlet valve 76 remaining opened by a depressing force on the brak pedal P. However, when the hydraulic pressure in the booster chamber 67 becomes larger than the depressing force on the brake pedal P, the valve piston 66 is forced back to close the inlet valve 76. If the brake pedal P is continued to be further depressed, the valve piston 66 advances again to open the inlet valve 76. Repeating of such an action results in a radid increase in hydraulic pressure in the booster chamber 67, as indicated by a characteristic line $P_2$-$P_3$ in FIG. 2. When the depressing force on the brake pedal P becomes larger than the hydraulic pressure (supplied oil pressure) in the booster chamber 67, the valve piston 66 advances at a stretch. However, the front end of the larger diameter portion 68a of the connecting rod 68 connected to the valve piston 66 abuts against the rear end of the larger diameter cylinder bore 65 in the booster piston 43 and hence, the advancing movement of the valve piston 66 is slight and stopped, and the stroke operation is stopped, as indicated by a characterisitic line $P_3$-$P_4$ in FIG. 2. The advancing and retreating of the valve piston 66 are extremely small movements for opening and closing the inlet valve 76 and hence, cannot damage the feeling of operation.

If the brake pedal P is released to release the operation of the master cylinder M, the spring 71 causes the valve piston 66 to first close the inlet valve 76 and then open the outlet valve 77. This permits the hydraulic pressure in the booster chamber 67 to be released, so that the operation piston 6 retreats to the retreat limit, while the hydraulic pressures in the output hydraulic pressure chamber 47 and the reaction chamber 48 are released, so that the booster piston 43 rapidly retreats to the retreat limit under the influence of the return spring 46 until its rear end abuts against the receiving tube 32.

Figure 2:
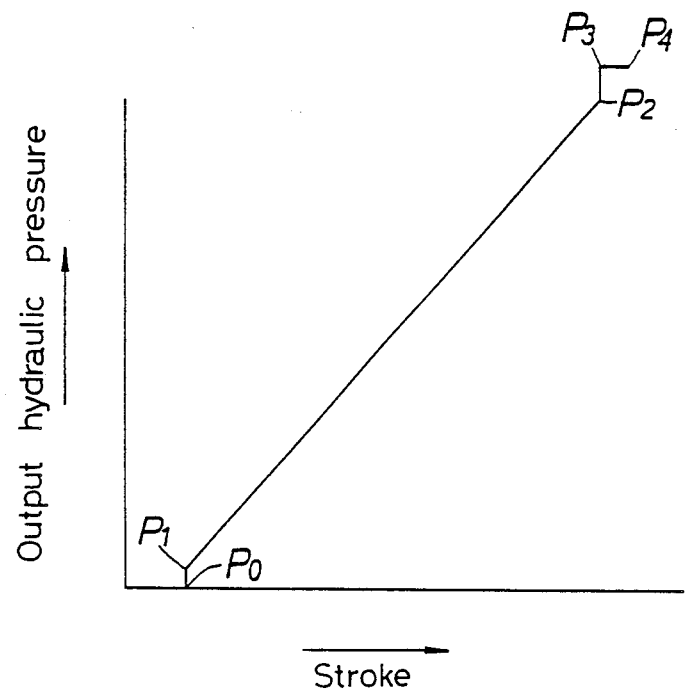

In such hydraulic boosting system, the characteristic line $P_1$-$P_2$ shown in FIG. 2 depends upon the balance of the oil pressure for urging the booster piston 43 forwardly by the hydraulic pressure in the output hydraulic pressure chamber 47, and the spring force for biasing the booster piston 43 rearwardly by the return spring 46 as well as the reaction force provided by the reaction chamber 48. And the range of the output hydraulic pressures from the master cylinder M corresponding to the stroke can be set in any extent by adjusting the loads of the return spring 46 and the spring 55. Moreover, if the hydraulic pressures from the master cylinder M up to a larger level are intended to correspond to the stroke, it is necessary to increase the loads of the return spring 46 and the spring 55, but burdening of the accumulator 49 with a major portion of such loads makes it possible to reduce the load of the return spring 46 to a relatively small level and thus, it is possible to make the return spring 46 relatively small to reduce the space for disposition thereof, leading to a reduction in size of the hydraulic boosting system B. Even if the burdening of the accumulator 49 is increased, the load of the spring 55 may be of a relatively small value and thus, the accumulator 49 may be also of a relatively small size, because the pressure receiving area of the piston 54 facing the oil chamber 52 is smaller than that of the booster piston 43 facing to the reaction chamber 48.

Suppose that a defect of hydraulic pressure has been produced in the hydraulic boosting system. In this case, the hydraulic pressure in the annular hydraulic pressure chamber 34 is reduced and hence, the piston guide 30 is held at the retreat limit by the action of the spring 31. Therefore, if the brake pedal P is depressed for braking, the valve piston 66 is operated to advance while compressing the spring 71, and after abutting of the connecting rod 68 against the booster piston 43, the latter advances while compressing the spring 31 and abuts at its front end against the rear end of the piston rod 10 connected to the operation piston 6 to urge the operation piston 6 forwardly, so that a hydraulic output pressure is produced in the master cylinder M. Further, after abutting of the piston guide 30 against the cylindrical guide 29, the booster piston 43 also advances, and the advancing movements of the valve piston 66 and the booster piston 43 continue until the booster piston 43 abuts against the piston guide 30. This makes it possible to provide a sufficient hydraulic output pressure from the master cylinder M and thus to provide a sufficient hydraulic braking pressure even at occurrence of any defect of hydraulic pressure.

Figure 3:
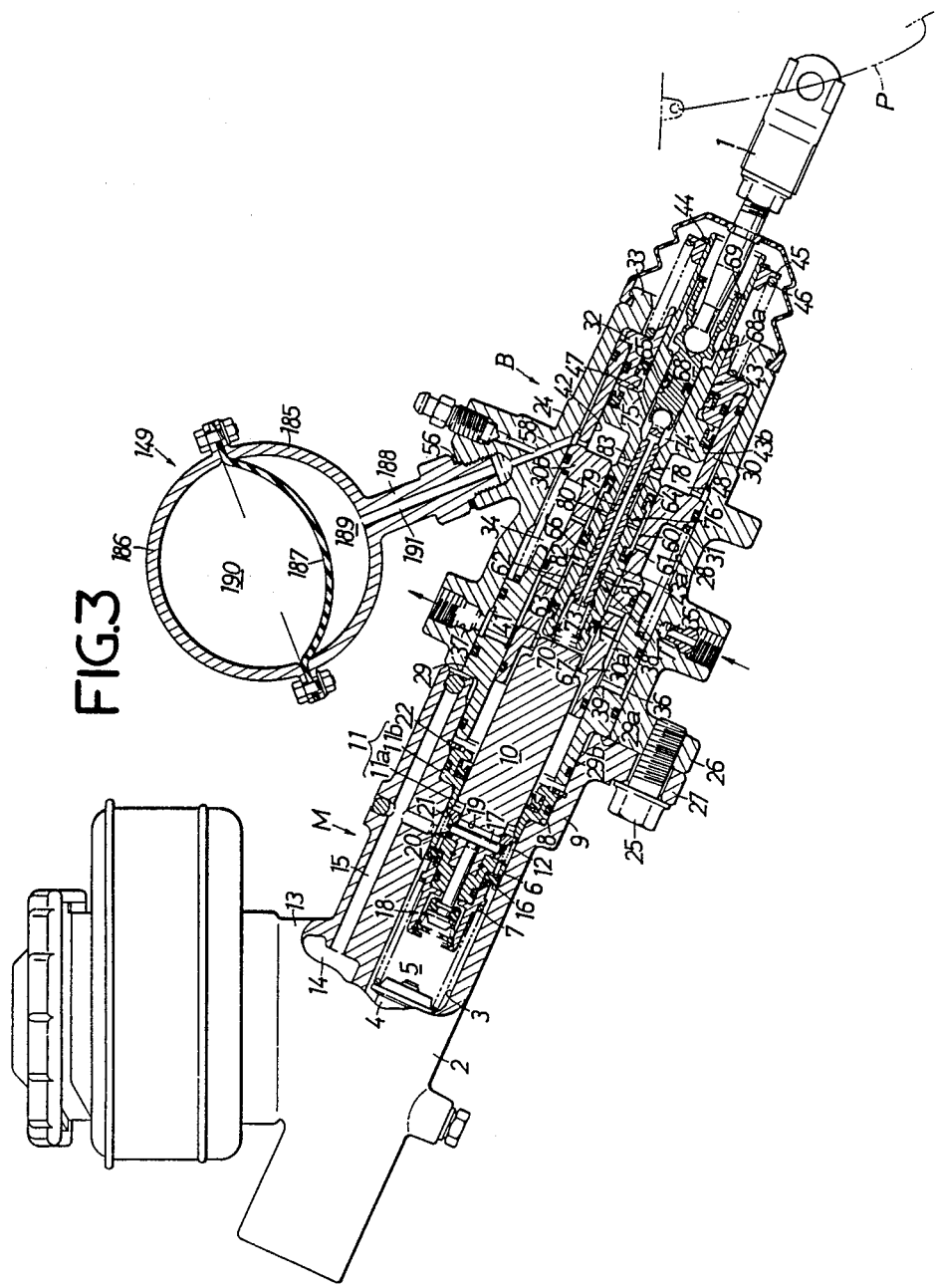
FIG. 3 is a longitudinal sectional side view of a second embodiment of a hydraulic booster system according to the present invention.

A second embodiment of the present invention will now be described with reference to FIG. 3.

In the second embodiment, the accumulator 49 in the previous first embodiment is replaced by an accumulator 149 of a different construction connected to the reaction chamber 48. The accumulator 149 comprises a bladder 187 clamped between a pair of hemi-spherical bodies 185 and 186 interconnected. One of the hemi-spherical bodies 185 is integrally provided with a tubular connecting portion 188 screwed into the booster cylinder 24. An oil chamber 189 is defined between the bladder 187 and the one hemi-spherical body 185, and a gas chamber 190 is defined between the bladder 187 and the other hemi-spherical body 186. The tubular connecting portion 188 is provided with an oil passage 191 which permits the communication between the oil passage 58 in the booster cylinder 24 and the oil passage 189.

With the second embodiment, a working oil in the reaction chamber 48, during advancing movement of the booster piston 43, enters the oil chamber 189 while deflecting the bladder 187 toward the gas chamber 190, so that a gas pressure produced due to the reduction of the volume of the gas chamber 190 acts on the booster piston 43 through the reaction chamber 48. Accordingly, it is possible to reduce the load of the return spring 46 as in the previous first embodiment.

A third embodiment of the present invention will described below with reference to FIGS. 4 and 5.

The third embodiment is different from the previous first and second embodiments in that a pair of cup-seals 249 and 250 are fitted over an outer peripheral surface of the larger diameter portion 43b of the booster piston 43 at locations axially spaced apart from each other in slidable contact with the inner surface of the piston guide 30 in order to provide a sealing between the output hydraulic pressure chamber 47 and reaction chamber 48 defined in the booster piston 43, and in that an accumulator 285 different in construction from those in the previous first and second embodiments is detachably connected to the reaction chamber 48.

The accumulator 285 in the third embodiment comprises an accumulator case 286 basically formed into a cylindrical shape, a cylindrical bottomed plug 287 removably closing an opened end of the accumulator case 286, an accumulator piston 289 slidably received in the accumulator case 286 to define an accumulator chamber 288 between the piston 289 and a closed end of the accumulator case 286, a first coiled-spring 290 for biasing the accumulator piston 289 in a direction to reduce the volume of the accumulator chamber 288, and a second coiled-spring 291 for biasing the accumulator piston 289 by cooperation with the first spring 290 in a direction to reduce the volume of the accumulator chamber 288, when the accumulator piston 289 slides, while compressing the first spring, in a direction to increase the volume of the accumulator chamber 288. The accumulator 285 further includes a reaction piston 292 axially slidably received in the plug 287 and capable of abutting against the accumulator piston 289, when the accumulator piston 289 slides, while compressing the first and second springs 290 and 291, in the direction to increase the volume of the accumulator chamber 288, and a resilient member 293 interposed between the plug 287 and the reaction piston 292 to bias the reaction piston 292 in a direction to abut against the accumulator piston 289.

The accumulator case 286 is coaxially provided, in sequence from its closed end side, with a first cylinder bore 294, a second cylinder bore 295 of a diameter larger than that of the first cylinder bore 294, a third cylinder bore 296 of a diameter larger than that of the second cylinder bore 295, and a threaded bore 297 of a diameter slightly larger than that of the third cylinder bore 296, and the accumulator piston 289 is slidably received in the first cylinder bore 294. Moreover, the sectional area of the first cylinder bore 294, i.e., the pressure receiving area of the accumulator piston 289 facing to the accumulator chamber 288 is set smaller than the pressure receiving area of the booster piston 43 facing to the reaction chamber 48. In addition, a receiving rib 298 is integrally provided on an intermediate portion of the accumulator piston 289 over its entire periphery and slidably fitted in the second cylinder bore 295.

On the other hand, the plug 287 is screwed into the threaded bore 297 in the accumulator case 286 and coaxially provided with a bottomed hole 299 opened to face inwardly of the accumulator case 286. The bottomed hole 299 comprises a larger diameter hole portion 299b and a smaller diameter hole portion 299c coaxially interconnected through a step 299a facing inwardly.

A first retainer 201 is provided to abut against the step 299a, and the spring 290 is interposed between the first retainer 201 and the receiving rib 298 of the accumulator piston 289. Additionally, a second retainer 202 is slidably received in the third cylinder bore 296 in the accumulator case 286, and the second spring 291 is interposed between the second retainer 202 and an inner end face of the plug 287. With the second spring 291 in a state of its free length, the second retainer 202 does not abut against a step 203 between the second cylinder bore 295 and the third cylinder bore 296. In addition, the receiving rib 298 of the accumulator piston 289 is capable of abutting against the second retainer 202 and abuts against the second retainer 202, when the accumulator piston 289 slides a predetermined distance in a direction to increase the volume of the accumulator chamber 288 while compressing the first spring 290.

The reaction piston 292 is slidably received in the smaller diameter hole portion 299c of the bottomed hole 299 in the plug 287, and a resilient member 293 is interposed between the reaction piston 292 and the closed end of the bottomed hole 299. Furthermore, the reaction piston 292 is restricted in inward movement by the first retainer 201, and a part of the reaction piston 292 in abutment against the first retainer 201 is passed through the first retainer 201 and projects inwardly to be able to abut against the accumulator piston 289.

The closed end of the accumulator case 286 is provided with a connecting opening 204 leading to the accumulator chamber 288. A side of the accumulator case 286 closer to the closed end is also provided with an oil passage 205 leading to the interior of the accumulator chamber 288, and an opening of the oil passage 205 is closed by a bleeder plug 206. On the other hand, the booster cylinder 24 is provided with a connecting opening 259 leading to the above-described oil passage 58, and the both connecting openings 204 and 259 are interconnected through a connecting line 207 screwed into the openings 204 and 259. Thus, the accumulator 285 leading to the reaction chamber 48 is detachably connected to the booster cylinder 24.

Figure 5:
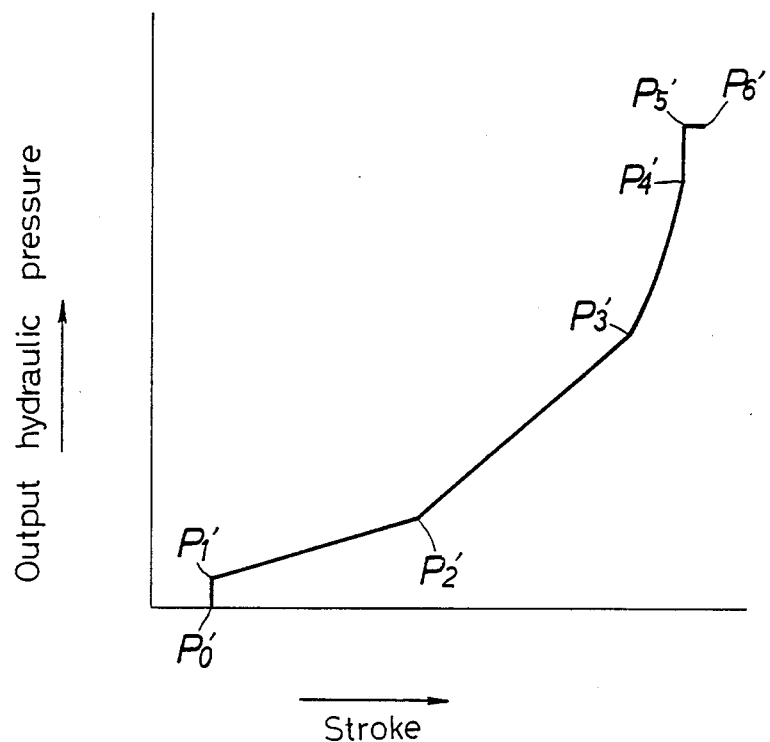

With the third embodiment, a relationship between the stroke and the hydraulic output pressure is as indicated in FIG. 5 by a characteristic line $P_0'$-$P_1'$-$P_2'$-$P_3'$-$P_4'$-$P_5'$-$P_6'$. In this case, the line sections $P_0'$-$P_1'$, $P_4'$-$P_5'$ and $P_5'$-$P_6'$ are obtained by operation of the hydraulic booster system of the third embodiment in the same manner as in the previous first embodiment and they correspond to the characteristic line sections $P_0$-$P_1$, $P_2$-$P_3$ and $P_3$-$P_4$ in the first embodiment, respectively. In addition, the characteristic line sections $P_1'$-$P_2'$-$P_3'$-$P_4'$ are obtained by operation of the hydraulic booster system in the third embodiment in the following manner.

After the hydraulic output pressure has reached a point $P_1'$, the valve piston 66 starts to advance by the depression of the brake pedal P, and thereafter the valve piston 66 and the booster piston 43 alternately perform advancing movements relative to each other in a repeated manner. The advancing movement of the booster piston 43 is caused by a rise in pressure within the output hydraulic pressure chamber 47 and such movement of piston 43 compress the return spring 46 and reduces the volume of the reaction chamber 48 in front thereof as in the previous first embodiment. During advancing movement of the booster piston 43, the on/off valve 78 is in its closed state, and the reaction chamber 48 is in a tightly closed state. Therefore, the contraction of the reaction chamber 48 causes the working oil therein to act on the accumulator chamber 288 in the accumulator 285 to urge the accumulator piston 289. Thus, the accumulator piston 289 first slides in a direction to increase the volume of accumulator chamber 288 while compressing the first spring 290, and after abutment of the receiving rib 298 against the second retainer 202, it then slides while compressing the first and second springs 290 and 291. Further, after abutting against the reaction piston 292, the accumulator piston 289 slides while compressing the resilient member 293 in addition to the first and second springs 290 and 291. Accordingly, the booster piston 43 of this embodiment advances while receiving a reaction force provided by the accumulator 285 in front thereof and a reaction force provided by the spring 46. The state of the booster piston 43 receiving the reaction force provided by only the first spring 290 is indicated by the characteristic line section $P_1'$-$P_2'$ in FIG. 5; the state of the booster piston 43 receiving the reaction force provided by the first and second springs 290 and 291 is indicated by the characteristic line section $P_2'$-$P_3'$, and the state of the booster piston receiving the reaction force provided by the resilient member 293 in addition to the first and second springs 290 and 291 is indicated by the characteristic line section $P_3'$-$P_4'$. Therefore, as the reaction force increases, the inclination of the characteristic line, that is, the ratio of the output pressure relative to the stroke becomes large.

With the third embodiment having the above-described construction, the line sections $P_1'$-$P_4'$ depend upon the balance of the oil pressure for urging the booster piston 43 forwardly by the hydraulic pressure in the output hydraulic pressure chamber 47 with respect to the spring force for biasing the booster piston 43 rearwardly by the action of the return spring 46 as well as the reaction force provided by the reaction chamber 48, as described above. The range in which the hydraulic output pressure from the master cylinder M is corresponded to the operational stroke can be set in a desired manner by adjusting the characteristics of the return spring 46 and the accumulator 285. If the range of the hydraulic output pressures up to an increased level is intended to correspond to the stroke, it is necessary to increase the loads of the return spring 46 as well as the first spring 290, the second spring 291 and the resilient member 293, but burdening of the accumulator 285 with a major portion of such loads makes it possible to reduce the load of the return spring 46 to a relatively small level to reduce the space for disposition thereof, leading to a reduction in size of the hydraulic booster B. Even if burdening of the accumulator 285 is increased, the loads of the first spring 290, the second spring 291 and the resilient member 293 may be of relatively small levels, respectively and hence, the accumulator 285 may be of a relatively small size, because the pressure receiving area of the accumulator piston 289 facing to the accumulator chamber 288 is smaller than that of the booster piston 43 facing to the reaction chamber 48.

In addition, the accumulator 285 is detachably connected to the booster cylinder 24, and another accumulator of a different characteristic may be easily connected to the booster cylinder 24, which makes it possible to easily adjust and change the relationship between the stroke of the push rod 1 and the hydraulic pressure produced, without varying the interior structure of the hydraulic booster B. Accordingly, when the hydraulic boosting system is used in a braking device for a vehicle, it is unnecessary to vary the structure of the hydraulic booster B itself in order to adapt the relationship between the stroke and the output hydraulic pressure to the type of the vehicle, and it is only required to connect an accumulator 285 of a different set characteristic to the booster cylinder 24 depending upon the type of the vehicle. This enables a reduction in cost with an increased diversion of the hydraulic booster B.

Figure 6:
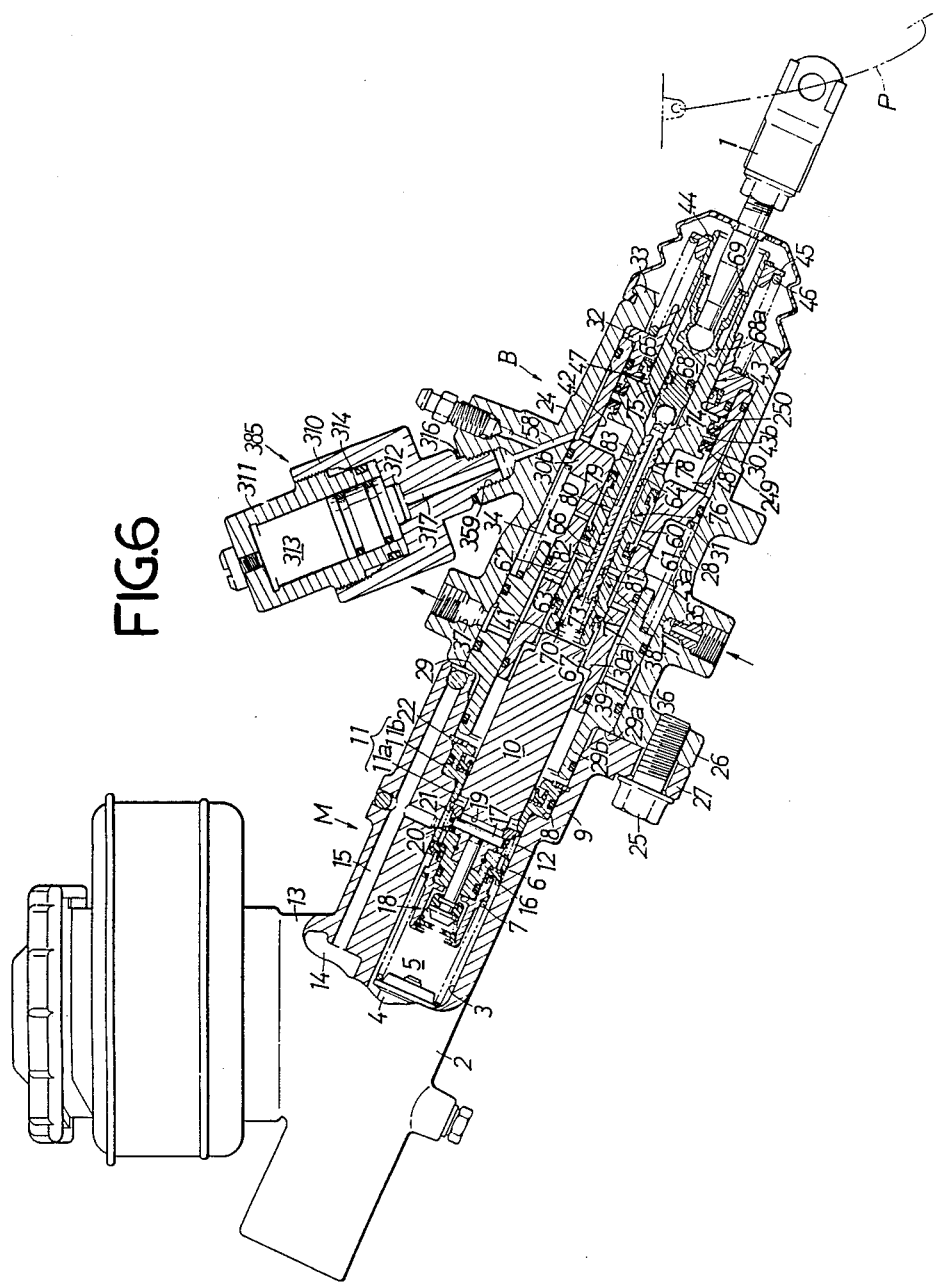
FIGS. 6 and 7 illustrate a fourth embodiment of a hydraulic booster system according to the present invention, FIG. 6 being a longitudinal sectional side view of the system, and FIG. 7 being a graph of an output characteristic of the system.

A fourth embodiment of the present invention will be described below with reference to FIGS. 6 and 7.

In this fourth embodiment, the accumulator 285 in the above third embodiment is replaced by an accumulator 385 of a different construction, which is detachably connected to the booster cylinder 24. The accumulator 385 is similar to the one 49 of first embodiment and comprises a cylindrical bottomed mounting 310 screwed into a connecting opening 359 in the booster cylinder 24, a cylindrical bottomed cylinder body 311 screwed into the mounting 310 in an oil-tightly fitted manner, a piston 314 oil-tightly and slidably received in the cylinder body 311 to provide an accumulator chamber 312 between a closed end of the mounting 310 and the piston 314 and to provide a gas chamber 313 between a closed end of the cylinder body 311 and the piston 314 and a gas confined in the gas chamber 313 to bias the piston 314 in a direction to contract the accumulator chamber 312. Moreover, the pressure receiving area of the piston 314 facing to the accumulator chamber 312 is set smaller than that of the booster piston 43 facing to the reaction chamber 48.

The mounting 310 is screwed into the booster cylinder 24 with a sealing member 316 interposed between the outer surface of the booster cylinder 24 and the mounting 310 and is provided at its closed end with an oil passage 317 which permits the accumulator chamber 312 to communicate with the oil passage 58 in the booster cylinder 24.

Figure 7:
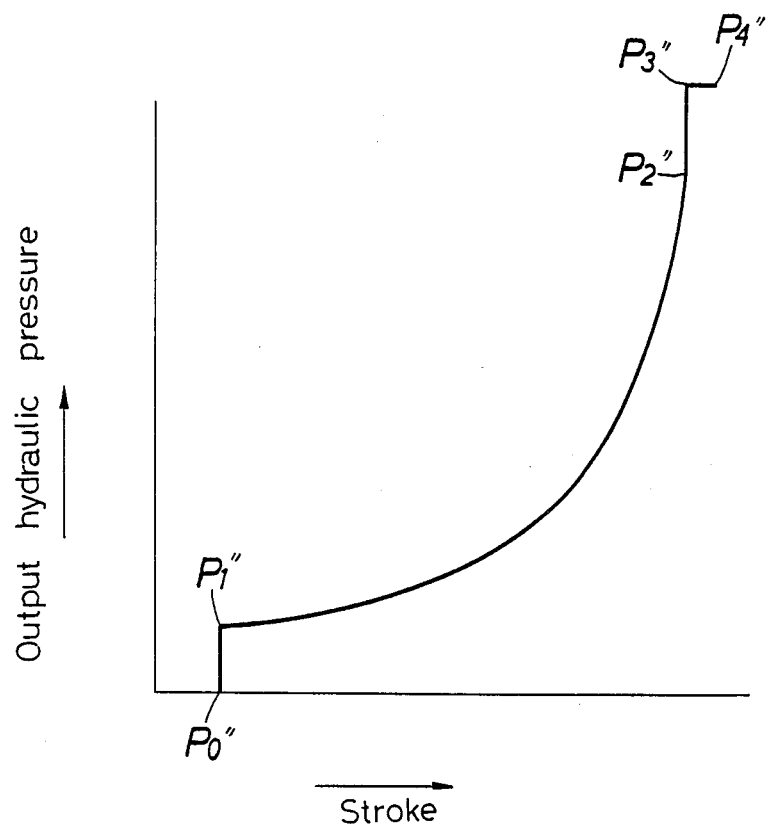

With this fourth embodiment, a relationship between the stroke and the output hydraulic pressure is as indicated by a characteristic line $P_0''$-$P_1''$-$P_2''$-$P_3''$-$P_4''$ in FIG. 7. Moreover, a characteristic line section $P_1''$-$P_2''$ depends upon the accumulator 385. Because the accumulator 385 is detachable from the booster cylinder 24, it may be easily replaced by another accumulator of a different characteristic. This enables an easy adjustment of the relationship between the stroke and the output hydraulic pressure without varying the interior structure of the hydraulic booster B. In addition, it is possible to reduce the load of the return spring 46 as in the previous first to third embodiments, and the accumulator 385 may be also of a relatively small size.

Figure 4:
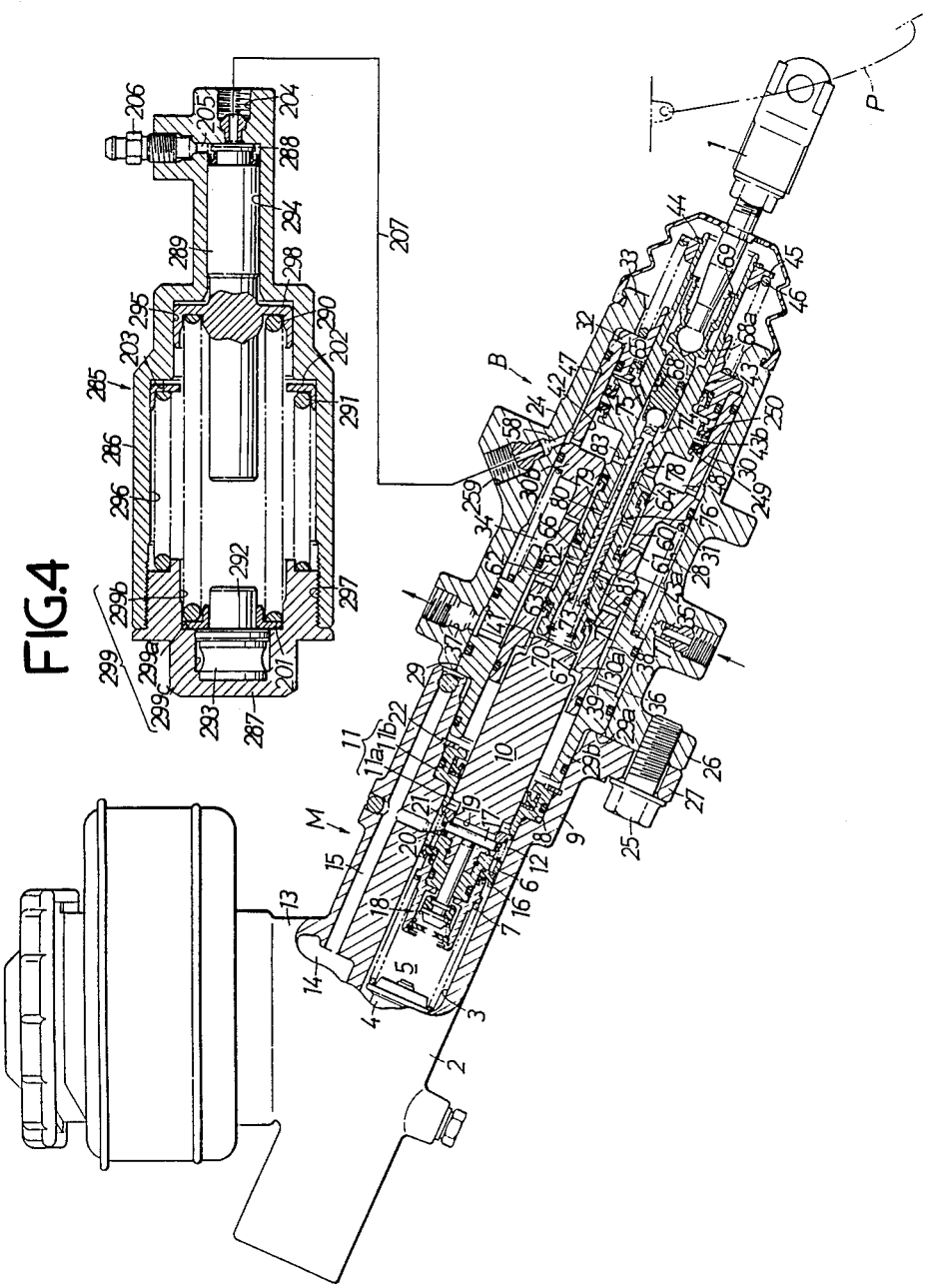
FIGS. 4 and 5 illustrates a third embodiment of a hydraulic booster system according to the present invention, FIG. 4 being a longitudinal sectional side view of the system, and FIG. 5 being a graph of an output characteristic of the system.

In a further embodiment of the present invention, the accumulator case 286 of the accumulator 285 in the previous third embodiment shown in FIG. 4 may be integral with the booster cylinder 24. In this modified case, the plug 287 closing the accumulator case 286 is openable and closable and hence, it is easy to replace the first spring 290, the second spring 291 and the resilient member 293 as biasing members for biasing in a direction to contract the accumulator chamber 288. By replacing at least any one of the first spring 290, the second spring 291 and the resilient member 293 to another of different set load, the relationship between the stroke of the push rod 1 and the generated hydraulic pressure can be extremely easily adjusted without varying the interior structure of the hydraulic booster B.

Now, when the hydraulic booster system in any of the above-described embodiments and an antilock brake device are equipped on a vehicle, it is possible to moderate a kick-back phenomenon of the antilock brake device. This is because an increase in hydraulic pressure in the booster chamber due to the kick-back causes an increase in hydraulic pressure in the output hydraulic pressure chamber 47, so that the booster piston 43 is moved forwardly to open the outlet valve 77.

In the description of the above second to fourth embodiments and the variation of the third embodiment, the corresponding members to those of the first embodiment are disignated by the same reference numerals and characters.

What is claimed is:

1. A hydraulic booster system comprising:
   a booster cylinder connected to a rear end of a cylinder body of a master cylinder;
   an inlet valve interposed between an output hydraulic pressure chamber defined to face a back of a booster piston and an input hydraulic pressure chamber leading to a hydraulic pressure supply source, said booster piston being received in said booster cylinder for forward and rearward movement and being spring-biased rearwardly, said inlet valve being adapted to be opened in accordance with an advancing operation of a valve piston, slidably disposed in said booster piston and movable relative thereto, said valve piston being connected to an operating member;
   an outlet valve interposed between said output hydraulic pressure chamber and an outlet chamber leading to an oil tank and adapted to be closed in accordance with an advancing operation of said valve piston relative to said booster piston;
   a booster chamber provided to face a rear end of an operation piston of the master cylinder;
   an oil feed passage made in said valve piston and adapted to permit communication between said input hydraulic pressure chamber and said booster chamber in response to opening of said inlet valve and further permit communication between said booster chamber and said outlet chamber in response to opening of said outlet valve;

a reaction chamber provided to face a front surface of said booster piston and adapted to be reduced in volume in accordance with the advancing movement of said booster piston; and an accumulator connected to said booster cylinder so as to lead to said reaction chamber.

2. A hydraulic booster system according to claim 1, further comprising a piston guide which is slidably fitted in the booster cylinder and is held at a retracted position thereof when said hydraulic pressure supply source is in a normally operable condition, said reaction chamber being defined between said booster piston and said piston guide.

3. A hydraulic booster system according to claim 1, wherein said booster piston is provided with a rod portion which penetrates through a rear end wall of the booster cylinder and projects rearwardly thereof, a spring being interposed between said rear end wall and said rod portion for biasing the booster piston in a retracted direction thereof.

4. A hydraulic booster system according to claim 1, wherein said booster cylinder is provided with an oil passage which permits communication between said reaction chamber and said accumulator.

5. A hydraulic booster system according to claim 4, wherein said accumulator is detachably connected to said booster cylinder.

6. A hydraulic booster system according to claim 5, wherein said accumulator comprises a cylindrical bottomed mounting fixed to said booster cylinder, a cylindrical bottomed cylinder body fixed to said mounting in an oil-tightly fitted manner, a piston oil-tightly and slidably received in said cylinder body to define an oil chamber between the piston and a closed end of said mounting and to define a secondary chamber between the piston and a closed end of said cylinder body, and a biasing means contained in said secondary chamber for biasing said piston in a direction to contract said oil chamber.

7. A hydraulic booster system according to claim 6, wherein said biasing means is a spring.

8. A hydraulic booster piston according to claim 6, wherein said biasing means is a gas confined in said secondary chamber.

9. A hydraulic booster system according to claim 6, wherein a pressure receiving area of said piston facing said oil chamber is set smaller than that of the booster piston facing the reaction chamber.

10. A hydraulic booster system according to claim 9, wherein said mounting is provided with an oil passage which permits communication between the oil chamber of the accumulator and the oil passage in the booster cylinder.

11. A hydraulic booster system according to claim 5, wherein said accumulator comprises a pair of hemi-spherical bodies interconnected, a bladder clamped between said hemi-spherical bodies, and a connecting tube integral with one of said hemi-spherical bodies and fixed to the booster cylinder, an oil chamber being defined between said bladder and said one hemi-spherical body and a gas chamber being defined between said bladder and the other hemi-spherical body.

12. A hydraulic booster system according to claim 11, wherein said connecting tube is provided with an oil passage which permits communication between the oil chamber in said accumulator and the oil passage in said booster cylinder.

13. A hydraulic booster system according to claim 4, wherein the accumulator is detachably connected to said booster cylinder.

14. A hydraulic booster system according to claim 4 or 13, wherein said accumulator includes an accumulator case in which an accumulator piston is slided to define an accumulator chamber leading to the reaction chamber, and a biasing means contained in said accumulator case for biasing said accumulator piston in a direction to contract the accumulator chamber, and said accumulator case is constructed to be openable and closable in order to allow replacement of the biasing member by another one for changing the characteristic of the accumulator.

15. A hydraulic booster system according to claim 14, wherein said accumulator case has an opening to which is mounted a cylindrical bottomed plug in a detachable manner.

16. A hydraulic booster system according to claim 15, wherein said biasing means comprises a first coiled spring for biasing said accumulator piston in a direction to reduce the volume of said accumulator chamber, a second coiled spring for biasing said accumulator piston by cooperation with the first spring in a direction to reduce the volume of the accumulator chamber, when the accumulator piston has slided a predetermined distance in a direction to increase the volume of the accumulator chamber while compressing said first spring, a resilient member axially slidably fitted in the plug and interposed between the plug and a reaction piston adapted for abutment against said accumulator piston, said resilient member serving to bias said reaction piston in a direction to abut against the accumulator piston, when said accumulator piston has slided a second predetermined distance in the direction to increase the volume of the accumulator chamber while compressing said first and second springs.

17. A hydraulic booster system according to claim 16, wherein said accumulator case is provided at its closed end with a connection opening leading to said accumulator chamber, and said booster cylinder is provided with a connection opening leading to the oil passage in said booster cylinder, these connection openings being interconnected through a connecting line fixed to said connection openings.

18. A hydraulic booster system according to claim 17, wherein the pressure receiving area of the accumulator piston facing said accumulator chamber is set smaller than that of the booster piston facing said reaction chamber.

* * * * *